(12) United States Patent
Henning et al.

(10) Patent No.: US 7,287,958 B2
(45) Date of Patent: Oct. 30, 2007

(54) METHODS AND APPARATUS FOR ASSEMBLING ROTATABLE MACHINES

(75) Inventors: Thomas Richard Henning, Cincinnati, OH (US); John D. Mickol, Cincinnati, OH (US); Daniel E. Mollmann, Cincinnati, OH (US); Michael H. Schneider, Loveland, OH (US); Andrew Breeze-Stringfellow, Cincinnati, OH (US); Timothy J. Horejs, West Chester, OH (US)

(73) Assignee: General Electric Company, Schenectady, NY (US)

( * ) Notice: Subject to any disclaimer, the term of this patent is extended or adjusted under 35 U.S.C. 154(b) by 262 days.

(21) Appl. No.: 11/032,408

(22) Filed: Jan. 10, 2005

(65) Prior Publication Data

US 2006/0153684 A1 Jul. 13, 2006

(51) Int. Cl.
*F01D 5/10* (2006.01)
*B21K 25/00* (2006.01)

(52) U.S. Cl. .............. 416/61; 416/144; 416/219 R; 29/889.22

(58) Field of Classification Search .............. 73/66; 29/889.2, 889.22; 700/279; 416/219 R, 416/61, 214 A, 215, 144, 248, 500
See application file for complete search history.

(56) References Cited

U.S. PATENT DOCUMENTS

| | | | |
|---|---|---|---|
| 3,888,601 A | 6/1975 | Glassburn | |
| 3,894,324 A | 7/1975 | Holzapfel et al. | |
| 4,213,736 A | 7/1980 | Gongwer | |
| 4,253,800 A | 3/1981 | Segawa et al. | |
| 4,474,534 A | 10/1984 | Thode | |
| 4,602,412 A * | 7/1986 | Partington et al. | 29/889.22 |
| 4,732,532 A | 3/1988 | Schwaller et al. | |
| 4,767,272 A | 8/1988 | Kildea | |
| 4,883,240 A | 11/1989 | Adamson et al. | |
| 4,971,641 A | 11/1990 | Nelson et al. | |
| 5,537,861 A | 7/1996 | Seitelman et al. | |
| 5,681,145 A | 10/1997 | Neely et al. | |
| 6,004,101 A * | 12/1999 | Schilling et al. | 416/224 |
| 6,908,285 B2 * | 6/2005 | Henning et al. | 416/144 |
| 7,051,436 B2 * | 5/2006 | Berger et al. | 29/889.21 |
| 7,090,464 B2 | 8/2006 | Henning et al. | |
| 2004/0013523 A1 | 1/2004 | Berger et al. | |

* cited by examiner

*Primary Examiner*—Igor Kershteyn
(74) *Attorney, Agent, or Firm*—William Scott Andes; Amrstrong Teasdale LLP

(57) ABSTRACT

A method, rotor assembly, and apparatus for ordering blades in a rotatable machine is provided. The rotor assembly includes a disk including a plurality of circumferentially-spaced blade root slots defined therein, and a plurality of blades, each blade including a root, a tip, and an airfoil therebetween, each blade positioned within a pre-determined slot based on a blade map, the blade map generated by a computer system configured to receive a geometric parameter measurement of each blade in a row of blades, determine a shape factor for the row of blades using the geometric parameter measurement of each blade, and determine a sequence map of each blade using the shape factor for the row of blades.

20 Claims, 5 Drawing Sheets

METHODS AND APPARATUS FOR ASSEMBLING ROTATABLE MACHINES

BACKGROUND OF THE INVENTION

This invention relates generally to gas turbine engines and, more particularly, to methods and apparatus for ordering blades in rotatable machines.

Gas turbines are used in different operating environments, such as, to provide propulsion for aircraft and/or to produce power in both land-based and sea-borne power systems. At least some known gas turbine engines include a core engine having, in serial flow arrangement, a fan assembly and a high pressure compressor that compress airflow entering the engine. A combustor ignites a fuel-air mixture that is then channeled through a turbine nozzle assembly towards high and low pressure turbines. The turbines each include a plurality of rotor blades that extract rotational energy from airflow exiting the combustor.

At least some known turbofan gas turbine engines include a fan assembly that includes a plurality of fan blades extending radially outwardly therefrom. During normal operation, gas turbine engines may experience high rotational speeds, and any imbalance of the rotor may induce vibrational stresses to the rotor and/or rotor bearings and/or support structures. Over time, continued operation with such stresses may lead to premature failure of the bearings, bearing support structure, and/or rotor components.

Moreover, at least some known commercial jet engine fans operate with a relative blade tip Mach number in the transonic regime and may be subject to an operating characteristic called multiple-pure-tone (MPT) noise, or buzzsaw noise. Such noise may occur if at least some blades are oriented differently relative to other blades extending around the circumference of the fan case. Moreover, such noise may occur if blade-to-blade geometry variations exist within the fan. As a result, variations may exist within the fan assembly in the amplitude (strength) and/or spacing of the shockwaves originating from those portions of the blades that have sonic or supersonic velocities. Specifically, at axial locations close to the fan blades, the noise due to the shock waves is generally at multiples of the fan shaft per revolution frequency, which is the frequency with which one point on the shaft passes any particular fixed point as it rotates.

Shock waves of different strengths may propagate at different speeds. Accordingly, as the shock waves travel away from the blades, the noise at a blade passing frequency degenerates into a broad spectrum of lower frequency tones as the shock waves merge with each other. Buzzsaw noise may be an issue with passenger annoyance and comfort, and may also adversely affect community noise levels.

To facilitate minimizing imbalance and multiple pure tone noise of the fan during operation, at least some known fan assemblies are assembled in a controlled manner. For example, one control that may be used in assembling fan rotors involves mapping each fan blade into specific slots in the fan base. Within other known fan assemblies, a moment weight of each fan blade is determined and is used to map each blade into specific fan base slots. However, mapping fan blades to specific slots in the fan base to minimize imbalance and/or multiple pure tone noise of the fan during operation may adversely impact the performance of the engine.

BRIEF DESCRIPTION OF THE INVENTION

In one embodiment, a rotor assembly is provided. The rotor assembly includes a disk including a plurality of circumferentially-spaced blade root slots defined therein, and a plurality of blades, each blade including a root, a tip, and an airfoil therebetween, each blade positioned within a pre-determined slot based on a blade map, the blade map generated by a computer system configured to receive a geometric parameter measurement of each blade in a row of blades, determine a shape factor for the row of blades using the geometric parameter measurement of each blade, and determine a sequence map of each blade using the shape factor for the row of blades.

In another embodiment, a computer system is provided. The computer system includes a computer program embodied on a computer readable medium for determining a blade mapping sequence for a gas turbine engine rotor that facilitates improving a performance of the associated gas turbine engine wherein performance comprises at least one of engine power and fuel efficiency, the program comprising a code segment that receives a geometric parameter measurement of each blade in a row of blades and then determines a shape factor for the row of blades using the geometric parameter measurement of each blade, and determines a sequence map of the rotor using the shape factor for the row of blades.

In yet another embodiment, a computer-implemented method of ordering blades in a rotatable machine is provided. The machine includes a plurality of blades that extend radially outwardly from a rotor. The method includes receiving a geometric parameter measurement of each blade in a row of blades, determining a shape factor for the row of blades using the geometric parameter measurement of each blade, and determining a sequence map for the rotor using the shape factor for the row of blades.

DETAILED DESCRIPTION OF THE INVENTION

Figure 1:
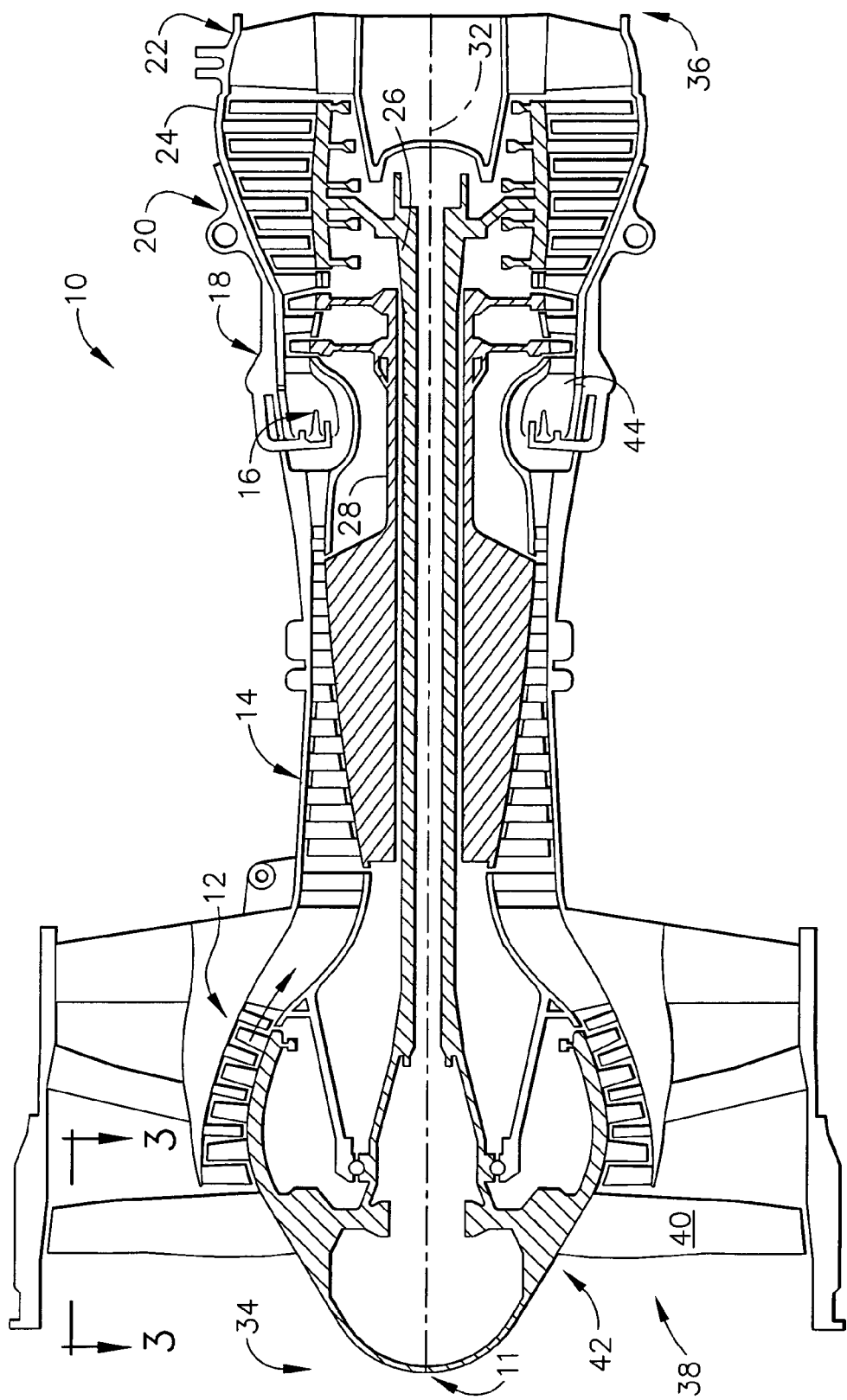
FIG. 1 is a schematic illustration of an exemplary gas turbine engine.

FIG. 1 is a schematic illustration of an exemplary gas turbine engine 10 including a rotor 11 that includes a low-pressure compressor 12, a high-pressure compressor 14, and a combustor 16. Engine 10 also includes a high-pressure turbine 18, a low-pressure turbine 20, an exhaust frame 22 and a casing 24. A first shaft 26 couples low-pressure compressor 12 and low-pressure turbine 20, and a second shaft 28 couples high-pressure compressor 14 and high-pressure turbine 18. Engine 10 has an axis of symmetry 32 extending from an upstream side 34 of engine 10 aft to a downstream side 36 of engine 10. Rotor 11 also includes a fan 38, which includes at least one row of airfoil-shaped fan blades 40 attached to a hub member or disk 42. Blades 40 are substantially identical with respect to each other blade 40, except that there are some small differences due to manufacturing tolerances. Blades 40 are coupled to disk 42 in a substantially equi-angularly spaced relationship to each other. In one embodiment, gas turbine engine 10 is a GE90 engine commercially available from General Electric Company, Cincinnati, Ohio.

In operation, air flows through low-pressure compressor 12 and compressed air is supplied to high-pressure compressor 14. Highly compressed air is delivered to combustor 16. Combustion gases 44 from combustor 16 propel turbines 18 and 20. High pressure turbine 18 rotates second shaft 28 and high pressure compressor 14, while low pressure turbine 20 rotates first shaft 26 and low pressure compressor 12 about axis 32. During some engine operations, such as during takeoff operations and other operating periods when engine power output is relatively high, fan 38 rotates such that a radially outer portion of blades 40 attains supersonic velocity. As a result, the supersonically rotating portions of blades 40 may produce shockwaves, which can be heard as noise. The noise may be spread over a broad tonal range, from many multiples of blade passing frequency down to the disk rotational frequency.

Figure 2:
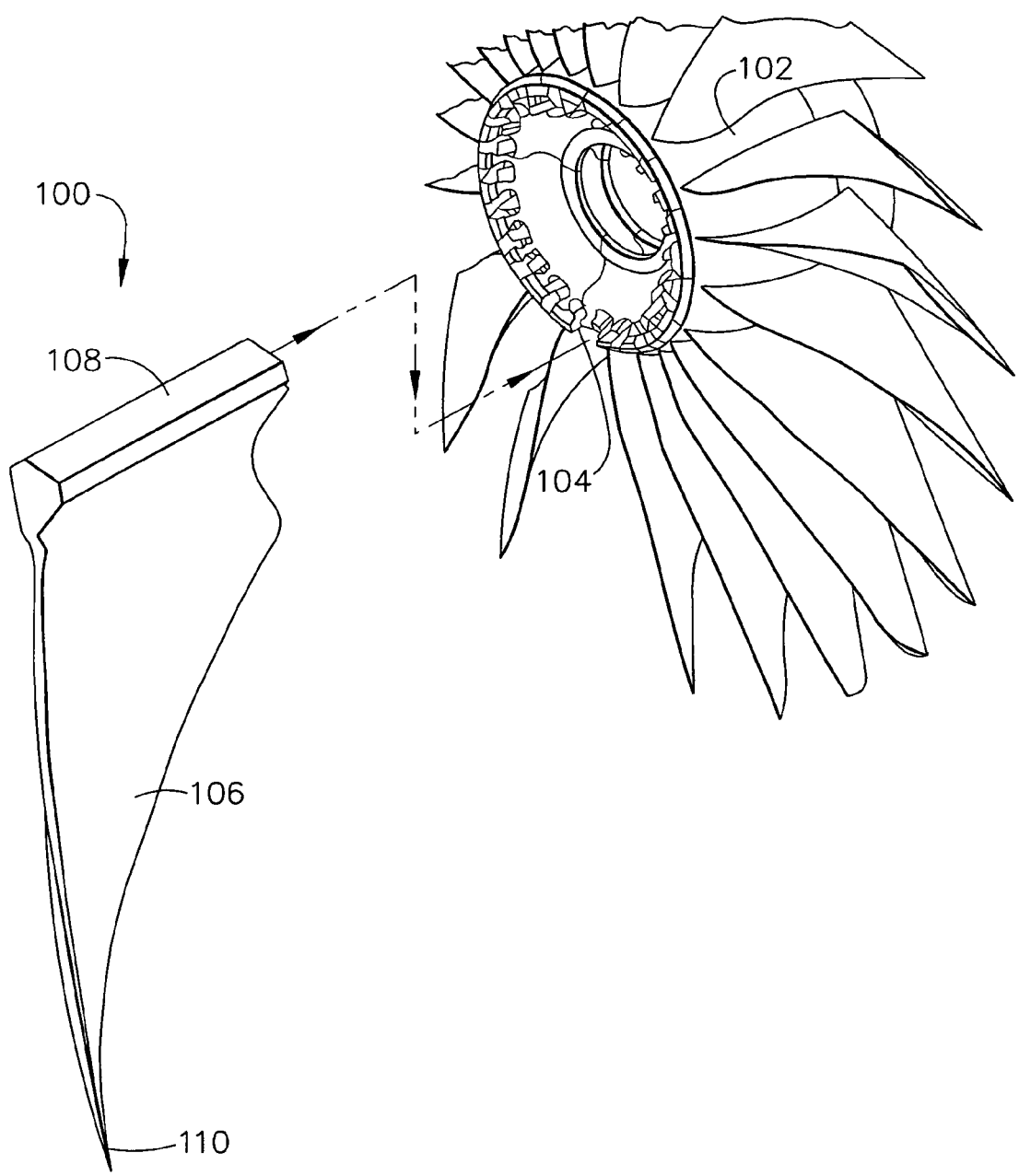
FIG. 2 is an exploded perspective view of an exemplary fan rotor and blading assembly that may be used with the gas turbine engine shown in FIG. 1.

FIG. 2 is an exploded perspective view of an exemplary composite blade 100 and fan rotor 102 that may be used with gas turbine engine 10. A plurality of circumferentially-spaced blades 100 are supported by fan rotor 102 through a dovetail slot 104. Each blade 100 includes an airfoil 106 that extends between a dovetail root 108 and a blade tip 110 such that each blade 100 is supported through dovetail root 108 and dovetail slot 104 by fan rotor 102. Blade 100 is representative of the plurality of circumferentially-spaced blades 100 that are each mapped into a specific slot 104 based on measured parameters of blade 100. In the exemplary embodiment, each blade 100 includes a composite airfoil 106 that includes a plurality of layered composite plies (not shown). More specifically, each blade 100 includes a first plurality of structural and load carrying airfoil plies in airfoil 106 and a second plurality of root plies in root 108.

Figure 3:
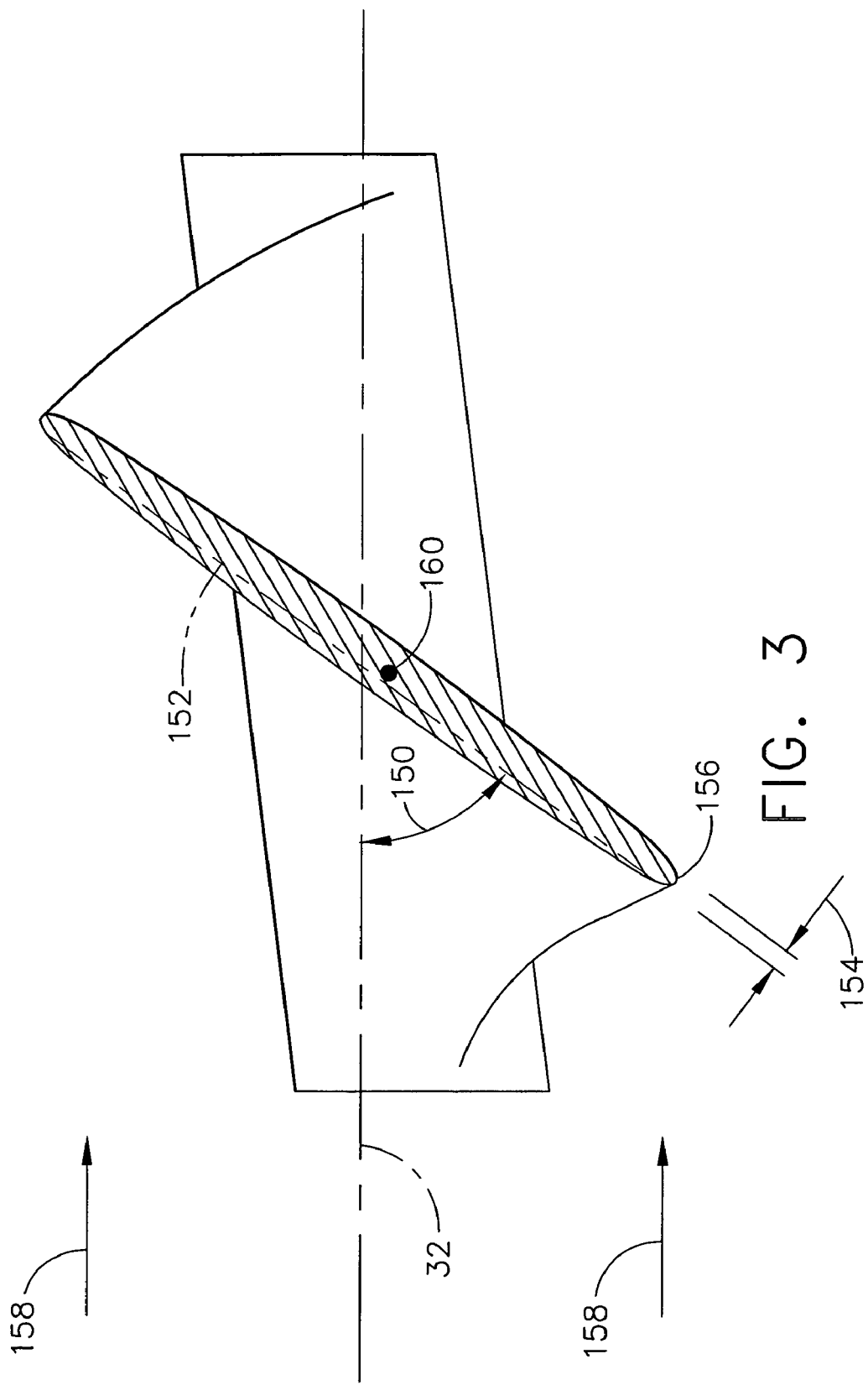
FIG. 3 is a cross-sectional view of an exemplary fan blade taken along line 3-3 shown in FIG. 1.

FIG. 3 is a cross-sectional view of an exemplary fan blade 40 taken along line 3-3 (shown in FIG. 1). An angle 150 represents an amount of section stagger angle of blade 40 at the cross-section of blade 40 illustrated. Generally, angle 150 is dependent on a radial distance from axis 32 to the cross-section of interest. In the exemplary embodiment, angle 150 is measured between a chord 152 at the cross-section and fan axis 32 of symmetry. A thickness 154 of blade 40 represents the thickness of a leading edge 156 of blade 40. Leading edge 156 is in relation to airflow 158 through fan 38. Each blade 40 includes a radial axis 160.

Factors of blade design that may affect pure multiple tone noise may also affect performance of the rotor and consequentially the engine are, for example, but are not limited to, differences of angle 150 from blade-to-blade, differences of thickness 154 from blade-to-blade, differences in the curvature of the blade airfoil at respective sections from blade-to-blade, and variations of spacing between adjacent blades. Various combinations of these factors in blades spaced about the rotor that may tend to improve the pure multiple tone noise characteristics of gas turbine engine 10 may adversely impact the thrust and/or fuel efficiency performance of gas turbine engine 10, and vice versa. For example, positioning a blade with a relatively closed stagger angle 150 between two blades having relatively open stagger angles 150 may cause an increase in the pure multiple tone noise characteristic of gas turbine engine 10 while facilitating improving the performance of the blade with the relatively closed stagger angle 150 such that the performance of engine 10 is also improved.

A shape factor of a blade map may be defined and quantified to facilitate mapping a blades 40 to fan rotor 102. The shape factor may be defined to represent the weighted average Fourier coefficient for a received or determined blade parameter and an initial blade map. For example, the fan blade map for a twenty two blade fan rotor would have one through eleven Fourier coefficients for any received or determined blade parameter. The magnitude being the measured dimensional aspect of the fan blade and the associated angle corresponding to the disk slot in which the blade resides.

Figure 4:
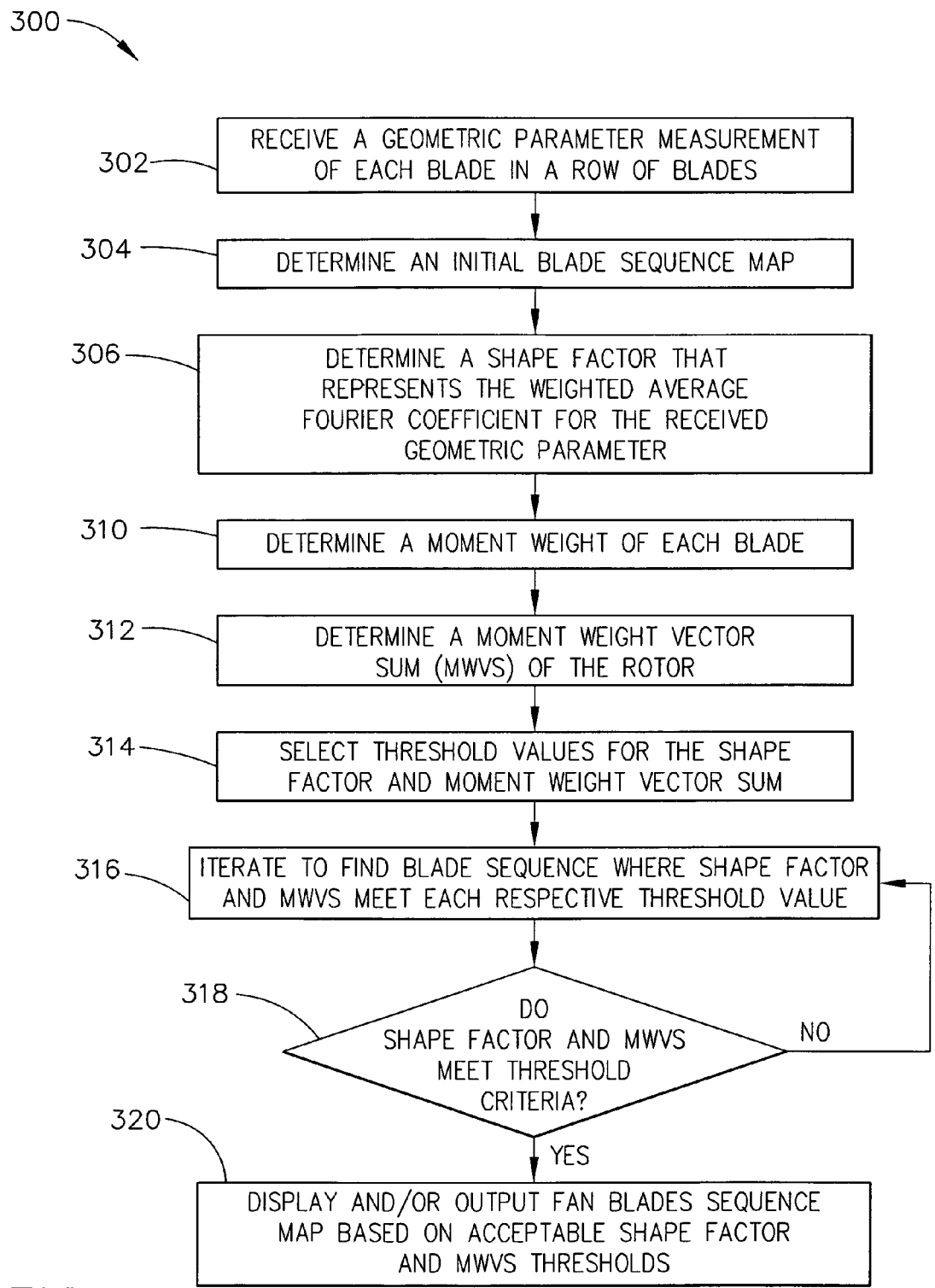
FIG. 4 is a flow diagram of an exemplary method for ordering blades in a rotatable machine, such as the turbine engine shown in FIG. 1.

FIG. 4 is a flow diagram of an exemplary method 300 that may be used for ordering blades in a rotatable machine, such as turbine 10 (shown in FIG. 1). In the exemplary embodiment, the machine is a gas turbine engine that includes a rotor, such as rotor 11, (shown in FIG. 1), that is rotatable about a longitudinal axis of symmetry of the engine. The rotor includes circumferentially-spaced slots for receiving the blades such that the blades extend radially between a blade root and a blade tip from the slots.

Method 300 includes receiving 302 a geometric parameter measurement of each blade in a row of blades. The fan blade geometric parameter may be based on a determination by a performance specialist and/or fan aerodynamics specialists relative to a customer specification. The geometric parameter may be any of a plurality of measurable blade parameters, for example, but not limited to, a blade section stagger angle, a blade tangential shift, and a blade thickness.

Each adjacent pair of blades defines a volume between the blades. The volume includes an inlet area extending between adjacent leading edges of the blades and an exit area extending between adjacent trailing edges of the blades. An inlet area to exit area ratio may be used to determine the geometric parameter that is used to map the blades into the rotor.

The blade section stagger angle may be defined as a rotation of at least a portion of a blade about a radial axis through a central region of the blade. The axis of stagger angle may be offset from a center radial axis of the blade, or may be coincident with the center radial axis. The blade tangential shift may be defined as a displacement of a blade tip in a circumferential direction in a plane of rotation of the row of blades containing the blade. The blade tangential shift may be used to quantify an amount that a blade is offset from a radial orientation and may also describe a blade that is bowed in the plane of rotation of the row of blades containing the blade. Blade thickness may refer to the thickness of the blade leading edge at a predetermined radial distance from the blade tip, the thickness of the blade trailing edge at a predetermined radial distance from the blade tip, and/or the thickness of the blade at a predetermined intermediate point at a predetermined radial distance from the blade tip. The geometric parameter measurement may be received from a blade manufacturer or may be determined after the blade is received at a manufacturing facility.

Prior to positioning blades onto the rotor disk, an initial or starting blade map is determined 304. A blade map may indicate a specific slot for each blade that will be assembled into the rotor and may indicate an order of installation of the blades. The starting position may be a "virtual" position, in that the blades are simulated being installed using a computer model of the rotor and blades. Subsequent iterative maps of blade location may also be virtual maps until a predetermined endpoint is reached during iteration, when a final blade map may be displayed and/or printed.

A shape factor that represents the weighted average Fourier coefficient for the received geometric parameter may be determined 306 from blade geometry data supplied by the blade manufacturer or may be determined by the manufacturing facility after receipt. For example, a blade thickness at a radial distance from axis 32 may be used to determine the shape factor. Alternatively, a parameter that is a combination of the received geometric parameters for an adjacent pair of blades may be determined and used to determine the shape factor. To determine a mapping order, a computer, including a processor, and a program code segment configured to select and deselect blades may be utilized. Specifically, a first blade may be selected for positioning in a specific slot based on the shape factor. Blades may then be iteratively rearranged in an order that facilitates maximizing the shape factor. Maximizing the shape factor facilitates generating a blade map that will produce an increase in engine performance. It may be desirable to reduce other parameters affecting engine performance factors other than fuel efficiency or thrust, such as engine noise and/or vibration. In such cases, other parameters may be iteratively attempted to be minimized while maintaining the shape factor greater than a predetermined minimum value. During the process of minimizing this parameter, the computer system generate intermediate blade mapping sequences for display and/or output, prompt a user for additional input and/or decision regarding the progress of the mapping. The computer system may then display the resultant blade map and generate a report detailing the selection process. Additionally, manual entry of blade parameters and recalculation of the blade map are supported.

A moment weight of each blade in a row of blades may be determined 310 and a moment weight vector sum of the rotor may also be determined 312. The moment weight may be determined by horizontally supporting a blade by its root in a device designed to measure moment weight. A moment weight is based not only on a pan weight of the blade, but also is based on a distribution of the weight of the blade along a radial distance extending between the blade root to the blade tip. In a rotating machine, an uneven distribution of moment weight of each blade spaced about the rotor may affect a balance condition of the rotor.

Threshold values for the shape factor and the moment weight vector sum are determined 314. The threshold values may be determined from an engineering or design requirement contained within a drawing or other technical or administrative document. The initial blade sequence is iteratively remapped 316 to increase the shape factor to a value greater than a shape factor predetermined threshold, and to reduce the moment weight vector sum of the rotor to a value that is less than a moment weight vector sum predetermined value. When the shape factor value, and the moment weight vector sum of the rotor meet 318 values that are within limits set by the respective predetermined threshold values, the final blade sequence map may be displayed 320 and/or output.

Figure 5:
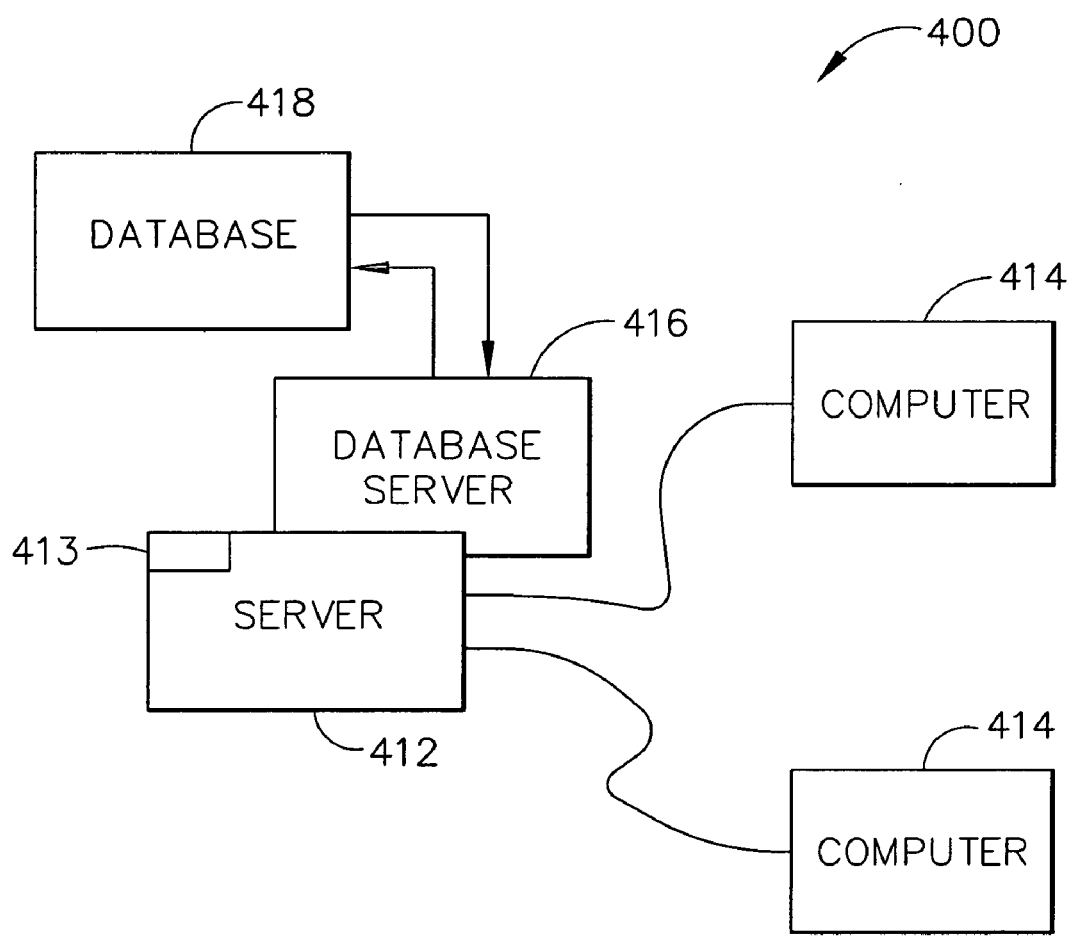
FIG. 5 is a simplified block diagram of an exemplary blade mapping computer system.

FIG. 5 is a simplified block diagram of a blade mapping computer system 400. As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer". Computer system 400 includes a server system 412 including a disk storage unit 413 for data storage, and a plurality of client sub-systems, also referred to as client systems 414, connected to server system 412. In one embodiment, client systems 414 are computers including a web browser, such that server system 412 is accessible to client systems 414 via the Internet. Client systems 414 are interconnected to the Internet through many interfaces including a network, such as a local area network (LAN) or a wide area network (WAN), dial-in-connections, cable modems and special high-speed ISDN lines. Client systems 414 could be any device capable of interconnecting to the Internet including a web-based phone, personal digital assistant (PDA), or other web-based connectable equipment. A database server 416 is connected to a database 418 containing information regarding engine components. In one embodiment, centralized database 418 is stored on server system 412 and can be accessed by potential users at one of client systems 414 by logging onto server system 412 through one of client systems 414. In an alternative embodiment database 418 is stored remotely from server system 412 and may be non-centralized.

Example embodiments of systems and methods that facilitate improving the performance of gas turbine engines are described above in detail. A technical effect of the systems and methods described herein includes iteratively mapping blades of determined geometric parameters and moment weight into the gas turbine engine rotor such that overall engine thrust and/or fuel efficiency performance is improved.

The above-described blade mapping system is a cost-effective and highly reliable method and system that may be used for determining a blade map that increase the gas turbine engine overall performance by improving the performance of the gas turbine engine fan. The method also iteratively remaps the blades to reduce a rotor moment weight vector sum to a value that is less than a predetermined threshold. Each system is configured to receive a geometric parameter measurement and a moment weight value for each blade, determine an initial blade location on the rotor, and generate a blade map based on iteratively increasing the shape factor of the rotor and reducing the rotor moment weight vector sum. Accordingly, the blade mapping method and system facilitates assembly, operation, and maintenance of machines, and in particular gas turbine engines, in a cost-effective and reliable manner.

Exemplary embodiments of blade mapping method and system components are described above in detail. The components are not limited to the specific embodiments described herein, but rather, components of each system may be utilized independently and separately from other components described herein. Each blade mapping system component can also be used in combination with other blade mapping system components.

While the invention has been described in terms of various specific embodiments, those skilled in the art will recognize that the invention can be practiced with modification within the spirit and scope of the claims.

What is claimed is:

1. A rotor assembly comprising:
   a disk comprising a plurality of circumferentially-spaced blade root slots defined therein; and
   a plurality of blades, each said blade comprising a root, a tip, and an airfoil therebetween, each said blade coupled within a pre-determined root slot based on a blade map, said blade map generated by a computer system programmed to:

receive a geometric parameter measurement of each blade in a row of blades;

determine a shape factor for said row of blades using the geometric parameter measurement of each said blade;

determine a sequence map for each blade using the shape factor for said row of blades; and output the sequence map including data for coupling each said blade within each said root slot.

2. A rotor assembly in accordance with claim 1 wherein said shape factor represents a weighted average of the received geometric parameters Fourier coefficients.

3. A rotor assembly in accordance with claim 1 wherein said computer system is further configured to:

remap the sequence of said blades to facilitate increasing the shape factor to a value that is greater than a predetermined value;

determine a moment weight of each blade in a row of blades;

determine a moment weight vector sum of the rotor; and iteratively remap the sequence of the blades to reduce the moment weight vector sum of the rotor to a value less than a predetermined limit.

4. A rotor assembly in accordance with claim 1 wherein said plurality of blades are composite fan blades.

5. A rotor assembly in accordance with claim 1 wherein said computer system is further configured to determine at least one dimensional difference between each pair of adjacent blades.

6. A rotor assembly in accordance with claim 1 wherein said computer system is further configured to determine a blade section stagger angle corresponding to the disk slot to which the blade is mapped.

7. A computer system comprising a computer program embodied on a computer readable medium for determining a blade mapping sequence for a gas turbine engine rotor that facilitates improving a performance of the associated gas turbine engine wherein performance comprises at least one of engine power and fuel efficiency, said program comprising a code segment that receives a geometric parameter measurement of each blade in a row of blades and then:

determines a shape factor for each said row of blades using the geometric parameter measurement of each said blade;

determines a sequence map of said rotor using the shape factor of said row of blades; and outputs the sequence map including data used for coupling each said blade within a respective blade root slot defined in a rotor disk.

8. A computer system in accordance with claim 7 wherein said shape factor represents a weighted average of the received geometric parameters Fourier coefficients.

9. A computer system in accordance with claim 7 comprising a code segment that remaps the sequence of said blades to facilitate increasing the shape factor to a value that is greater than a predetermined value.

10. A computer system in accordance with claim 7 comprising a code segment that:

determines a moment weight of each blade in a row of blades;

determines a moment weight vector sum of the rotor; and iteratively remaps the sequence of the blades to reduce the moment weight vector sum of the rotor to a value less than a predetermined limit.

11. A computer system in accordance with claim 7 comprising a code segment that determines at least one dimensional difference between each pair of adjacent blades.

12. A computer system in accordance with claim 7 comprising a code segment that determines a blade section stagger angle corresponding to the disk slot to which the blade is mapped.

13. A computer system in accordance with claim 7 comprising a code segment that generates a blade map that maps each blade into a respective rotor slot that facilitates increasing a shape factor to a value that optimizes the engine performance and facilitates reducing the moment weight vector sum value of said rotor to a value that is less than a predetermined value.

14. A computer-implemented method of ordering blades in a rotatable machine that includes a plurality of blades that extend radially outwardly from a rotor, said method comprising:

receiving a geometric parameter measurement of each blade in a row of blades;

determining a shape factor for said row of blades using the geometric parameter measurement of each said blade;

determining a sequence map for the rotor using the shape factor of said row of blades; and outputting the sequence map including data used for coupling each said blade within a respective blade root slot defined in said rotor.

15. A method in accordance with claim 14 wherein determining a shape factor for each said row of blades comprises determining a shape factor for said row of blades wherein the shape factor represents a weighted average of the received geometric parameters Fourier coefficients.

16. A method in accordance with claim 14 further comprising:

determining a moment weight of each blade in a row of blades; and determining a moment weight vector sum of the rotor.

17. A method in accordance with claim 14 further comprising remapping the sequence of the blades comprises iteratively remapping the sequence of the blades to facilitate increasing the shape factor to a value that is greater than a predetermined value.

18. A method in accordance with claim 14 wherein determining a shape factor for said row of blades comprises determining at least one dimensional difference between each pair of adjacent blades.

19. A method in accordance with claim 14 wherein determining a shape factor for said row of blades comprises determining a blade section stagger angle corresponding to the disk slot to which the blade is mapped.

20. A method in accordance with claim 14 further comprising generating a blade map mapping each blade into a respective rotor slot that facilitates increasing a shape factor to a value that optimizes the engine performance and facilitates reducing the moment weight vector sum value of the rotor to a value that is less than a predetermined value.

* * * * *